UNITED STATES PATENT OFFICE 2,398,599

CHLORINATED HYDANTOINS

Arthur O. Rogers, Lewiston, N. Y., assignor to E. I. du Pont de Nemours & Company, Wilmington, Del., a corporation of Delaware No Drawing. Application May 11, 1943, Serial No. 486,545

9 Claims. (Cl. 260—309.5)

This invention relates to certain new chlorine-containing compounds, and to a method by which those compounds may be prepared from readily available starting materials. More particularly, it relates to 3,3'-dichloro-1,1'-methylene-bis-(5-methyl-5-ethyl hydantoin), and 3,3'-dichloro-1,1'-methylene-bis-(5-methyl-5-isobutyl hydantoin). These are solid products containing available chlorine. The invention also relates to a method by which these compounds may be prepared from 1,1'-methylene-bis-(5-methyl-5-ethyl hydantoin) and 1,1'-methylene-bis-(5-methyl-5-isobutyl hydantoin).

1,1'-methylene-bis-(5-methyl-5-ethyl hydantoin) also termed N,N'-methylene-bis-(5-methyl-5-ethyl hydantoin), and the corresponding 5-methyl-5-isobutyl compound, and a method by which these compounds may be readily prepared from hydantoins and formaldehyde are described in the copending patent application of Joseph Frederic Walker, Serial No. 484,638, filed April 26, 1943. They are compounds having the following structural formula:

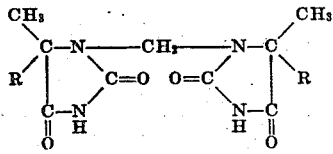

wherein R is an organic alkyl radical selected from the group which consists of ethyl and isobutyl.

I have now found that certain novel chlorine-yielding compounds may be prepared by reacting chlorine with 1,1'-methylene-bis-(5-methyl-5-ethyl hydantoin) and 1,1'-methylene-bis-(5-methyl-5-isobutyl hydantoin) in an aqueous reaction medium which is alkaline in reaction. The resulting products, 3,3'-dichloro-1,1'-methylene-bis-(5-methyl-5-ethyl hydantoin) and 3,3'-dichloro-1,1'-methylene-bis-(5-methyl-5-isobutyl hydantoin) are solid products which are represented by the generic formula:

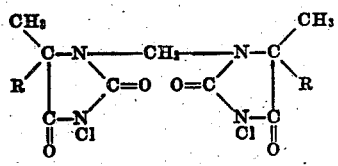

wherein R represents an alkyl radical selected from the group which consists of ethyl and isobutyl. They are active chlorine-yielding agents and may be used in place of hypochlorites or other chlorine-yielding chemicals, being generally less water sensitive than those products. The new compounds are characterized by low reactivity in moist air, low vapor pressure, and high molecular weight. They possess solubility characteristics much different from those of other chlorinated methylene-bis hydantoin compounds.

In preparing the new chemical compounds, 1,1'-methylene-bis-(5-methyl-5-ethyl hydantoin) or 1,1'-methylene-bis-(5-methyl-5-isobutyl hydantoin) is dissolved in an aqueous alkaline solution. The solution may be rendered alkaline by the use of any basic material which does not have an adverse effect resulting in the breaking of the ring structure of the starting material. I have utilized sodium carbonate to secure high yields, but other basic materials such as lime, sodium hydroxide, sodium bicarbonate, etc., may also be used.

Gaseous chlorine is passed into the aqueous alkaline solution containing the dissolved methylene-bis-dialkyl hydantoin compound. Complete solution of the entire amount of the methylene-bis-dialkyl hydantoin compound is not necessary, and the reaction will proceed to completion even when there is present undissolved starting material. The temperature should be below 40° C. and preferably in the range of 30° to 40° C. The amount of chlorine passed in should be regulated so that two atoms of chlorine are introduced into the methylene-bis-dialkyl hydantoin, replacing the two hydrogen atoms attached to nitrogen. This may involve testing samples of the product from time to time to determine its chlorine content, thereby insuring complete replacement of both hydrogen atoms by chlorine.

When the chlorination is substantially complete the product is filtered off and washed in distilled water. The filtrate may contain some unconverted starting material, and by passing chlorine into this filtrate additional amounts of the dichloro product may be recovered.

3,3'-dichloro-1,1'-methylene-bis-(5-methyl-5-ethyl hydantoin) is a white powder containing approximately 19.2% of active chlorine as prepared, and melting at 158 to 160° C. 3,3'-dichloro-1,1'-methylene-bis-(5-methyl-5-isobutyl hydantoin) is a white powder of fluffy characteristics containing about 16.4% of active chlorine as prepared. It melts to a viscous fluid at approximately 65° C. The product exhibits, to some extent, the characteristics of a resin in that its melting point is somewhat indefinite, the liquid product, on cooling, having a tendency to supercool.

The solubility of these two new active chlorine-yielding compounds in various solvents, in grams per 100 grams of solvent at 25° C., is given in the following table.

| Solvent | Solubility at 25° C. in grams per 100 grams of solvent | |
|---|---|---|
| | 3,3'-dichloro-1,1'-methylene-bis-(5-methyl-5-ethyl hydantoin) | 3,3'-dichloro-1,1'-methylene-bis-(5-methyl-5-isobutyl hydantoin) |
| Tetrachlorethane | 115 | 21 |
| Carbon tetrachloride | 0.8 | 9.5 |
| Trichlorethylene | 5 | 16 |
| Perchlorethylene (tetrachlorethylene) | 0.26 | 10.3 |
| Naphtha | (¹) | 2.1 |
| Kerosene | 0.07 | 0.35 |
| Water | 0.0046 | 0.003 |

¹ Undetermined.

The compounds hydrolyze in water yielding solutions containing various amounts of active chlorine. The solutions are valuable as antiseptic and bactericidal agents, and for various bleaching and decolorizing purposes. Solutions in inert solvents may be used for impregnating cloth or other fibrous materials, or for other purposes.

As examples of the preparation of these chemical compounds, the following are illustrative.

Example 1

1,1'-methylene-bis-(5-methyl-5-ethyl hydantoin) in the amount of 0.055 mole was suspended in a solution of 0.12 mole of sodium carbonate in 300 cubic centimeters of water. Chlorine gas was passed in at a temperature within the range 30 to 40° C. until the reaction medium was substantially neutral in reaction.

The product, 3,3'-dichloro-1,1'-methylene-bis-(5-methyl-5-ethyl hydantoin) was obtained in yields equivalent to 90% of the theoretical. It was a white powder, melting at 158 to 160° C., and containing approximately 19.2% of active chlorine.

Example 2

1,1'-methylene-bis-(5-methyl-5-isobutyl hydantoin) in the amount of 0.054 mole was suspended in a solution of 0.12 mole of sodium carbonate in 400 cubic centimeters of water. Chlorine gas was passed into the reaction mixture at a temperature of 30 to 40° C. until said reaction mixture was substantially neutral in reaction.

The product was 3,3'-dichloro-1,1'-methylene-bis-(5-methyl-5-isobutyl hydantoin) in the form of a white fluffy powder. The active chlorine content was 16.4%. The compound melted to a viscous liquid at approximately 65° C.

Various changes may be made in the preferred procedure as herein described without departing from the spirit of my invention.

I claim:

1. A dichloro-1,1'-methylene-bis-(5,5-dialkyl hydantoin) having the following formula:

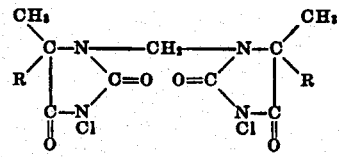

wherein R is an alkyl radical selected from the group which consists of ethyl and isobutyl.

2. 3,3'-dichloro-1,1'-methylene-bis-(5-methyl-5-ethyl hydantoin).

3. 3,3'-dichloro-1,1'-methylene-bis-(5-methyl-5-isobutyl hydantoin).

4. The method of preparing a 3,3'-dichloro-1,1'-methylene-bis-(5,5-dialkyl hydantoin) which comprises reacting chlorine with a 1,1'-methylene-bis-(5,5-dialkyl hydantoin) in a dilute aqueous alkaline medium.

5. The method of preparing a 3,3'-dichloro-1,1'-methylene-bis-(5,5-dialkyl hydantoin) which comprises reacting chlorine with a 1,1'-methylene-bis-(5,5-dialkyl hydantoin) in a dilute aqueous alkaline medium containing sodium carbonate, said reaction being carried out at a temperature below 40° C.

6. The method of preparing 3,3'-dichloro-1,1'-methylene-bis-(5-methyl-5-ethyl hydantoin) which comprises reacting chlorine with 1,1'-methylene-bis-(5-methyl-5-ethyl hydantoin) in a dilute aqueous alkaline medium.

7. The method of preparing 3,3'-dichloro-1,1'-methylene-bis-(5-methyl-5-ethyl hydantoin) which comprises reacting chlorine with 1,1'-methylene-bis-(5-methyl-5-ethyl hydantoin) in a dilute aqueous alkaline medium containing sodium carbonate, said reaction being carried out at a temperature below 40° C.

8. The method of preparing 3,3'-dichloro-1,1'-methylene-bis-(5-methyl-5-isobutyl hydantoin) which comprises reacting chlorine with 1,1'-methylene-bis-(5-methyl-5-iso-butyl hydantoin) in a dilute aqueous alkaline medium.

9. The method of preparing 3,3'-dichloro-1,1'-methylene-bis-(5-methyl-5-isobutyl hydantoin) which comprises reacting chlorine with 1,1'-methylene-bis-(5-methyl-5-isobutyl hydantoin) in a dilute aqueous alkaline medium containing sodium carbonate, said reaction being carried out at a temperature below 40° C.

ARTHUR O. ROGERS.